July 2, 1935.  E. L. THEARLE  2,007,010
PORTABLE VIBRATION INDICATOR
Filed Feb. 1, 1934
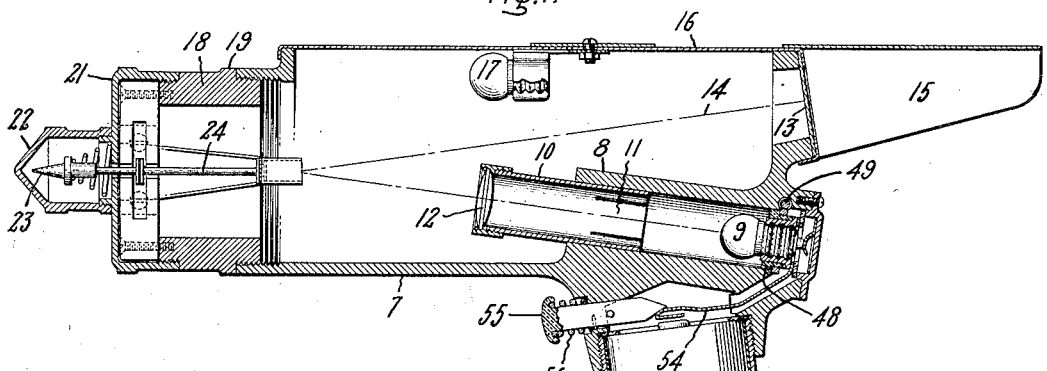
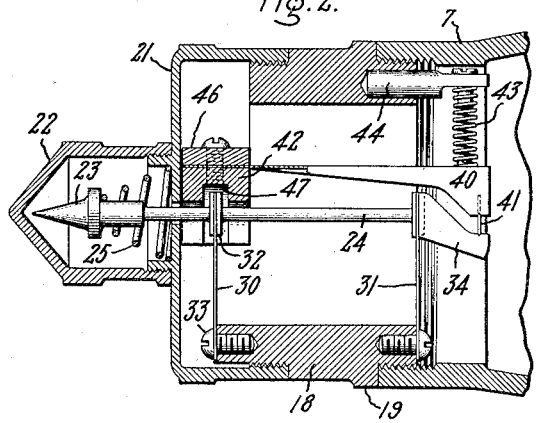
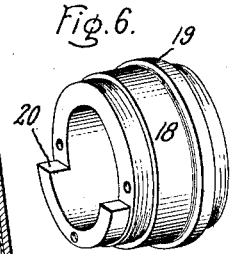
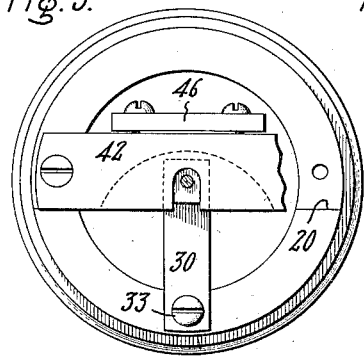
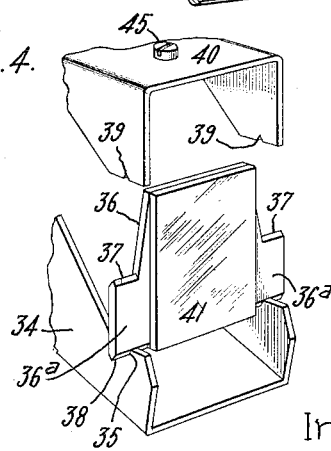
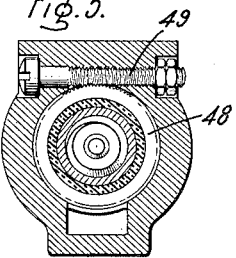
Inventor:
Ernest L. Thearle,
by Harry E. Dunham
His Attorney.

Patented July 2, 1935

2,007,010

UNITED STATES PATENT OFFICE 2,007,010

PORTABLE VIBRATION INDICATOR

Ernest L. Thearle, Schenectady, N. Y., assignor to General Electric Company, a corporation of New York Application February 1, 1934, Serial No. 709,392

8 Claims. (Cl. 73—51)

The present invention relates to portable vibration indicators for indicating the amplitude of vibration of bodies, and especially of bodies rotating at high speeds as of the order of 10,000 R. P. M., for example. To accurately indicate vibrations of bodies running at such high speeds requires an instrument having extreme sensitivity to vibration, especially to minor vibrations, which in turn requires a total absence of lost motion or back-lash in the moving parts, and a minimum of friction.

The object of my invention is the provision of a portable vibration indicator of improved construction which is extremely sensitive and in which means are provided to prevent lost motion or back-lash of the moving parts.

For a consideration of what I believe to be novel and my invention, attention is directed to the accompanying description and to the claims appended thereto.

In the accompanying drawing which is illustrative of my invention, Fig. 1 is a longitudinal section of a vibration indicator; Fig. 2 is an enlarged longitudinal sectional view of the actuating mechanism; Fig. 3 is an enlarged view of certain parts of the mechanism looking toward the front end; Fig. 4 is an enlarged perspective view of the parts supporting the mirror; Fig. 5 is a cross-section showing means for turning the small incandescent lamp, and Fig. 6 is a perspective view of front end of the casing or barrel.

7 indicates the main casing which to give it substantial mass is made of a casting. It is provided with a tubular socket 8 at one end of which is located a small incandescent lamp 9 such as are commonly used in so-called flashlights. In the outer end of the socket is a thin-walled metal tube 10 having spring fingers 11 to cause frictional engagement with the inner wall of the socket to hold the tube in its adjusted position. The outer end of the tube carries a small lens 12 by means of which a beam of light from the lamp can be concentrated on a mirror as will be referred to later. In the rear of the casing is located a semi-transparent plate 13 on which are suitable scale marks by which the extent of movement of the light beam, indicated by the broken and dotted line 14, can be observed. The scale plate is partly shielded from extraneous light by a sheet metal member 15 which is closed at the top and elsewhere open. The member is or may be secured to the main casing by a friction fit.

The top of the casing 7 is closed by a removable cover plate 16 which on its under side carries a spare incandescent lamp 17.

To the front end of the casing is secured, as by screw threads, a ring or barrel 18 of relatively massive construction to add weight to the instrument. On the other hand, the moving parts are light in weight so as to be extremely sensitive to vibrations of the body being examined. The ring is provided with an external shoulder 19 which engages the casing to properly position it. The shape of the end of the ring or barrel is best shown in Fig. 6. It is provided with a cut-away portion 20 to form a seat for a part of the actuating mechanism. The ring is closed at its outer end by a removable screw-threaded cap 21. The cap is provided with a centrally arranged screw-threaded projection to receive a protecting cap 22 for the needle 23. The needle is screw threaded to the outer end of a member or rod 24 so that it may be replaced in case of injury. Parts 23 and 24 form in effect one element. The purpose of making part 23 separable from part 24 is to permit of the replacement of the part 23 in case of injury thereto, especially to the point, without having to disassemble the head. The needle has a shoulder and between it and the cap is a small and relatively light-coiled compression spring 25 which serves to hold the needle in contact with the body being examined when the point of the needle is lightly pressed into contact therewith.

To avoid friction and lost motion and at the same time form an adequate support for the member or rod 24, the latter is supported by two thin flat springs 30 and 31 which form a parallel motion support and at the same time permit the rod and needle freely to follow the vibrations of the body being examined when the needle is in contact therewith. The spring 30 is rigidly secured to the rod 24 by means of a collar 32 formed integral with the rod or which may be made as a separate piece and rigidly secured thereto. The lower end of the spring is firmly secured in place by a screw 33. The springs are very flexible and freely respond to vibrations of the needle and rod in a longitudinal direction but are quite stiff against sidewise movements.

The spring 31 is secured at its lower end by a screw and at its upper end is firmly secured to a thin metal U-shaped element 34, best shown in Fig. 4, said member being rigidly attached to the rod 24. By making the element 34 of U-shaped section, a very rigid construction is obtained with a minimum weight of metal. The right hand or rear end of the element 34 is provided with a pair of knife-edge seats 35. In these seats is supported a thin metal element 36 having projections 36a on opposite sides, each of said projections having knife-edges 37 and 38, the latter being located in the seats 35. By using two projections in spaced relation, the advantage is obtained that all tendency of the mirror to twist out of its proper position is obviated. In practice, it is desirable to make the vertical distance between knife-edges 37 and 38 small because the shorter this distance, the greater will be the angular or tilting movement of the mirror for a given movement of the needle due to vibration. As an illustration, but not as a limitation, a distance of one-tenth of an inch between knife-edges 37 and 38 has been found to be satisfactory. It is to be noted that the knife-edges 37 are in the plane of the axis of the rod 24 and the seats 39 therefore are, of course, in the same plane. The seats 39 are formed in the upper element 40 which is also of U-shaped cross-section but inverted with respect to element 34. The seats 39 being stationary, the knife-edges 37 rock thereon as the lower element 34 moves to and fro. When the two elements are assembled, they form a box-like arrangement and located in the space thus formed is the main body of the tiltable element 36. On this element is mounted a mirror 41 which reflects a beam of light from the lamp 9 and lens 12 on to the scale plate 13. In the case of the instrument illustrated, a movement of the beam of light on the scale is 100 times greater than the movement of the mirror. I have used a similar mounting for a mirror in which the ratio of movement was 200 to 1.

The upper element 40, as above stated, is of inverted U-shaped section at one end. The side walls of the element taper toward the front and terminate at a point near the stationary supporting block 42. As a result of this, the element 40 is capable of yielding vertically in Fig. 2 by a limited amount which is sufficient to ensure engagement of the knife-edges 37 and 38 with their respective seats and to take up any back-lash. Above the element 40 is a coiled compression spring 43 which at all times exerts sufficient pressure thereon to hold the knife-edges in their seats and thus eliminate any lost motion or backlash from any cause. The upper end of the spring engages the flattened end of a pin 44 mounted in the ring or barrel 18. A screw carried by the pin and a small pin or screw 45 on the element 40 serve to hold the spring against sidewise movements.

As shown in Figs. 2 and 6, the ring or member is cut away at 20 and located in the cut-away portion is a block 42 which is secured in place by screws at its opposite ends, as best shown in Fig. 3. The block may, however, be made integral with the member 18 if desired. The front end of the element 40 rests on the block and is clamped thereon by a bar 46. The underside of the block 42 is cut away to form a recess 47 in which is located the collar 32, on the needle supporting rod. The walls of the recess act as stops to limit the longitudinal movements of the needle 23 and rod 24 and thus prevent injury to the supporting and mirror actuating mechanism.

In order that the position of the filament in the lamp 9 may be angularly adjusted to give the proper image on the mirror, the lamp and its socket are mounted in a ring 48, said ring having worm teeth on its periphery. The ring makes an easy fit in socket 8 and the surrounding wall acts as a bearing therefor. Above the ring is a worm 49 the teeth of which engage those on the ring. By turning the worm, the ring 48 and lamp may be angularly adjusted. The worm is provided with a nut and lock nut to clamp it in its proper position.

Depending from the main casing 7 is a tubular handle or grip 50, and located therein are two dry battery cells 51 which may be replaced by removing the screw-threaded cap 52. A small spring 53 is situated between the cap and the metallic shell of the lower battery. 54 indicates a contact spring, one end of which engages the shell of the lamp, the center contact being grounded on the casing as is also the spring 53 at the lower end of the handle. One end of the contact spring 54 is moved into engagement with the center terminal of the battery by the inward movement of an actuator 55 made of insulating material. When the actuator is released by a finger of the operator, a spring 56 moves the actuator to the left and permits the spring contact to open the circuit.

To use the instrument, the protecting cap 22 for the needle is removed, the needle moved into engagement with the vibrating body such as the frame of a dynamo-electric machine, or the pedestal of a shaft of a rotating body, and the battery circuit closed. The beam of light from the lamp 9 is reflected by the mirror onto the scale plate 13, and the movement of the beam thereon is a measure of the vibration of the body being examined.

By using a parallel motion support of the character described for the needle and rod 24, friction and lost motion is eliminated. By arranging the knife-edges of the mirror support in the manner described with the spring 43 holding the knife-edges in firm contact with both the upper seats 39 and the lower seats 35, all lost motion or backlash is eliminated. The arrangement also automatically compensates for wear and hence after the instrument is properly calibrated, it will remain so.

By taking off the cap 22 and unscrewing the needle, the spring 25 can be removed and later the cap 21. This arrangement permits of opening the instrument for inspection without disturbing the needle actuating and supporting means.

What I claim as new and desire to secure by Letters Patent of the United States, is:—

1. A vibration indicator comprising a casing, a needle means, a parallel motion support therefor, a movable element actuated by the needle means as it vibrates and which is provided with a seat, a stationary element also having a seat, a mirror, a support therefor having knife edges engaging the seats of both elements, said mirror being moved by the needle means, means for holding the knife edges firmly on their seats, a lamp arranged to direct a beam of light on to the mirror, and a scale plate on which the beam is reflected by the mirror.

2. A vibration indicator comprising a casing, a needle, a rod supporting the needle, spaced spring means for the rod forming a parallel motion support therefor, a pair of elements having opposed seats, one of the elements being supported by and moving with the rod and the other by the casing, a member having knife edges supported by the seats and rocked by the element supported by the rod as the latter is moved by the needle, a spring means acting to hold the knife edges in their respective seats, a mirror supported by the member, a lamp arranged to direct a beam of light on to the mirror, and a scale plate on to which the beam is reflected by the mirror.

3. A vibration indicator comprising a casing, a needle, a rod supporting the needle, spaced flat springs supporting the rod and permitting it to move freely in a longitudinal direction only, an element secured to the rod and having a pair of knife edge seats, a second element located above the first and provided with a pair of knife edge seats, a means fastening the second element to the casing, a member having knife edges which engage said seats, a mirror mounted on the member, a lamp arranged to direct a beam of light on to the mirror, and a scale plate upon which the beam of light from the mirror is directed.

4. A vibration indicator comprising a casing, a needle, a rod supporting the needle, spaced flat springs supporting the rod and permitting it to move freely in a longitudinal direction only, an element secured to the rod and having a pair of knife-edge seats, a second element located above the first and provided with a pair of knife-edge seats, the seats in one of the elements being below the axial plane of the rod and those of the other element in said plane, a means fastening one of the elements to the casing, a member having knife edges on its side edges which rest in said seats, a mirror mounted on the member, a lamp supported by the casing and arranged to direct a beam of light on to the mirror, and a scale plate also carried by the casing upon which the beam of light from the mirror is directed.

5. A vibration indicator comprising a casing, a needle, a member attached to and moved by the needle, a parallel motion support for the member, an element secured to and supported by the member provided with a knife-edge seat, a flexible element having a knife-edge seat at one end, means for securing the other end of the element in a fixed position, a member having knife edges located in said seats, a means acting on the free end of the flexible element to hold the seats of both elements in firm engagement with the knife edges of the member, a mirror mounted on the last named member and moved thereby, a source of light and a scale plate on to which a beam of light is directed by the mirror.

6. A vibration indicator comprising a casing, a needle, a member attached to and moved by the needle as it vibrates, a parallel motion support for the member, a collar on the member, a fixed support having means for limiting the movements of the collar, a pair of elements having opposed knife-edge seats, one of said elements being secured to and moved by the member, the other being secured to the support, and a mirror means supported by the seats of both elements and adapted to be moved by the one attached to the needle.

7. A vibration indicator comprising a casing, a needle, a member attached to and moved by the needle, a pair of flat spaced springs supporting the member, a thin metal element of U-shaped section secured to the member, a second thin metal member of U-shaped section at one end and flat at the other, both of said elements having seats, a member supported by both of the elements and having knife edges engaging said seats, a mirror moved by the last named member in response to a movement of one of the elements, and a means for automatically taking up backlash between the knife edges and their respective seats.

8. A vibration indicator comprising a casing, a needle, a member carrying the needle, and moved thereby, springs supporting the member and forming a parallel motion suspension therefor, an element secured to the member, a yieldable element secured at one end to the casing, the other end being free, each of said elements being provided with a seat, a mirror support having knife edges resting on both of the seats, and a spring means acting on the free end of the yieldable element to eliminate lost motion between the knife edges and their respective seats.

ERNEST L. THEARLE.